United States Patent
Filachek et al.

(10) Patent No.: US 10,235,214 B2
(45) Date of Patent: Mar. 19, 2019

(54) HIERARCHICAL PROCESS GROUP MANAGEMENT

(71) Applicant: International Business Machines Corporation, Armonk, NY (US)

(72) Inventors: Christopher D. Filachek, Lagrangeville, NY (US); Gabriel Nieves, Poughkeepsie, NY (US); Michael J. Shershin, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 69 days.

(21) Appl. No.: 15/191,600

(22) Filed: Jun. 24, 2016

(65) Prior Publication Data

US 2017/0371712 A1    Dec. 28, 2017

(51) Int. Cl.
*G06F 9/50* (2006.01)
*G06F 9/48* (2006.01)
*G06F 11/34* (2006.01)

(52) U.S. Cl.
CPC .......... *G06F 9/5083* (2013.01); *G06F 9/4843* (2013.01); *G06F 9/5027* (2013.01); *G06F 9/5061* (2013.01); *G06F 11/34* (2013.01); *G06F 2209/504* (2013.01); *G06F 2209/508* (2013.01)

(58) Field of Classification Search
CPC .............................. G06F 9/5027; G06F 9/4843
See application file for complete search history.

(56) References Cited

U.S. PATENT DOCUMENTS

| | | |
|---|---|---|
| 7,415,671 B2 | 8/2008 | Sylor et al. |
| 7,499,939 B2 | 3/2009 | Jandhyala et al. |
| 7,769,861 B2 | 8/2010 | Bendich et al. |

(Continued)

FOREIGN PATENT DOCUMENTS

JP    2010108266    5/2010

OTHER PUBLICATIONS

Disclosed Anonymously (2016) Efficient Resource Identification Management Scheme Across Independent but Related Resource Pool in a Hierarchical Resource Scenario of a Switch Assembly System, IPCOM000245533D, Mar. 15, 2016, 26 pages.

(Continued)

*Primary Examiner* — Jacob D Dascomb
(74) *Attorney, Agent, or Firm* — Cantor Colburn LLP; Teddi Maranzano

(57) ABSTRACT

Management of hierarchical process groups is provided. Aspects include creating a group identifier having an associated set of resource limits for shared resources of a processing system. A process is associated with the group identifier. A hierarchical process group is created including the process as a parent process and at least one child process spawned from the parent process, where the at least one child process inherits the group identifier. A container is created to store resource usage of the hierarchical process group and the set of resource limits of the group identifier. The set of resources associated with the hierarchical process group is used to collectively monitor resource usage of a plurality of processes in the hierarchical process group.

15 Claims, 5 Drawing Sheets

(56) References Cited

U.S. PATENT DOCUMENTS

| | | | |
|---|---|---|---|
| 8,209,701 B1* | 6/2012 | Roytman | G06F 9/5027 |
| | | | 718/106 |
| 8,255,915 B1* | 8/2012 | Blanding | G06F 9/5027 |
| | | | 709/223 |
| 8,683,103 B2 | 3/2014 | Ripberger | |
| 9,118,538 B1 | 8/2015 | Lekkalapudi et al. | |
| 9,262,181 B2 | 2/2016 | Campbell et al. | |
| 2012/0259436 A1 | 10/2012 | Resurreccion et al. | |
| 2015/0135187 A1 | 5/2015 | Lee et al. | |
| 2017/0061160 A1* | 3/2017 | Simonov | G06F 21/6281 |

OTHER PUBLICATIONS

Grace Period Disclosure: G. Nieves, Monitor and control resource usage for groups of entry control blocks in IBM Z/TPF, IBM developerWorks, Apr. 5, 2016, 8 pages.

List of IBM Patents or Patent Applications Treated as Related, Sep. 7, 2018, 2 pages.

U.S. Appl. No. 16/124,554 filed Sep. 7, 2018, Entitled: Hierarchical Process Group Management, First Named Inventor: Christopher D. Filachek.

* cited by examiner

HIERARCHICAL PROCESS GROUP MANAGEMENT

STATEMENT REGARDING PRIOR DISCLOSURES BY THE INVENTOR OR A JOINT INVENTOR

The following disclosure is submitted under 35 U.S.C. 102(b)(1)(A): "Monitor and control resource usage for groups of entry control blocks in IBM z/TPF" by Gabriel Nieves appearing in IBM developerWorks, Apr. 5, 2016, pages 1-8.

BACKGROUND

The present invention generally relates to computer processing systems, and more particularly to managing multiple computer processes in a hierarchical process group.

In multi-tasking processing systems, multiple processes can be active at the same time, where each process consumes processing system resources (e.g., main memory, CPU, disks, etc.). Resource monitoring utilities typically collect system resource usage by individual processes in isolation. This method of resource monitoring does not prevent a group of associated processes from collectively depleting all of the system resources. Resource depletion can be caused by a process creating numerous children processes, which individually may not raise any suspicions from a resource manager because each process does not exceed its own resource limits. A legitimate program with a defect or a malicious "fork bomb" may starve the processing system of all available resources by spawning additional processes to consume the resources. A typical solution is to establish resource limits on the entire system, which only mitigates the effect and reduces the performance of all of the other processes in the processing system.

Therefore, heretofore unaddressed needs still exist in the art to address the aforementioned deficiencies and inadequacies.

SUMMARY

In accordance with an embodiment, a computer-implemented method for managing hierarchical process groups is provided. The method includes creating a group identifier having an associated set of resource limits for shared resources of a processing system. The method further includes associating a process with the group identifier and creating a hierarchical process group including the process as a parent process and at least one child process spawned from the parent process, where the at least one child process inherits the group identifier. The method also includes creating a container to store resource usage of the hierarchical process group and the set of resource limits of the group identifier. The set of resource limits associated with the hierarchical process group is used to collectively monitor resource usage of a plurality of processes in the hierarchical process group.

In accordance with another embodiment, a computer program product for hierarchical process group management includes a non-transitory storage medium readable by a processing circuit and storing instructions for execution by the processing circuit for performing a method. The method includes creating a group identifier having an associated set of resource limits for shared resources of a processing system and associating a process with the group identifier. A hierarchical process group is created that includes the process as a parent process and at least one child process spawned from the parent process, where the at least one child process inherits the group identifier. A container is created to store resource usage of the hierarchical process group and the set of resource limits of the group identifier. The set of resource limits associated with the hierarchical process group is used to collectively monitor resource usage of a plurality of processes in the hierarchical process group.

In a further embodiment, a processing system for hierarchical process group management includes a memory system and one or more processors operable to share access to the memory system. The one or more processors are configured to create a group identifier having an associated set of resource limits for shared resources of the processing system and associate a process with the group identifier. The one or more processors are further configured to create a hierarchical process group including the process as a parent process and at least one child process spawned from the parent process, where the at least one child process inherits the group identifier. The one or more processors are also configured to create a container to store resource usage of the hierarchical process group and the set of resource limits of the group identifier and use the set of resource limits associated with the hierarchical process group to collectively monitor resource usage of a plurality of processes in the hierarchical process group.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for managing hierarchical process groups (HPGs). Embodiments can improve computer system resource management, for example, by collecting and monitoring resource usage by groups of associated processes and taking targeted actions on the groups that are exceeding respective allocated sets of limits. In exemplary embodiments, an HPG is created when a parent process elects to be part of a group using a group identifier and spawns a child process. The HPG becomes a container for collecting and monitoring the resource usage for both processes and any future children. Resource limits of the HPG are assigned from the group identifier. By separating the creation of resource limits and monitoring groups, a single group identifier (also referred to as a named limit set) can be used to assign the same resource limits to more than one HPG.

Figure 1:
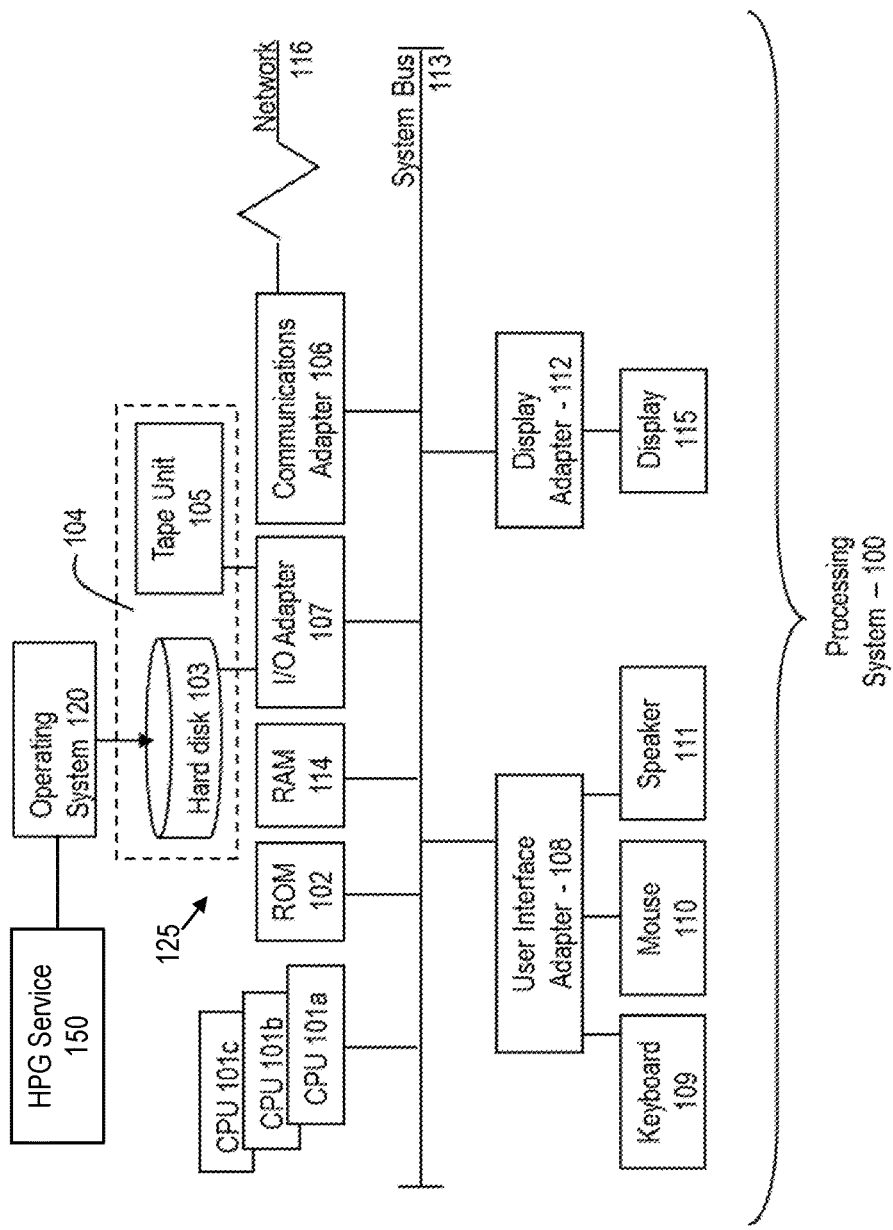
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to volatile memory (e.g., random access memory (RAM)) 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability in memory system 125 including the volatile memory 114 and/or mass storage 104, input means such as keyboard 109 and mouse 110, and output capability including speaker 111 and display 115. In one embodiment, a portion of the volatile memory 114 and mass storage 104 collectively store the operating system 120 to coordinate the functions of the various components shown in FIG. 1.

An HPG service 150 can be incorporated in or interface with the operating system 120 to manage HPGs in accordance with embodiments as further described herein. In alternate embodiments, the HPG service 150 is incorporated in or accessible as a cloud computing service and/or other remotely accessible service (e.g., a distributed storage service accessible via network adapter 106). The HPG service 150 can create HPGs, add processes to HPGs, remove processes from HPGs, and monitor resource usage with respect to defined limits.

Figure 2:
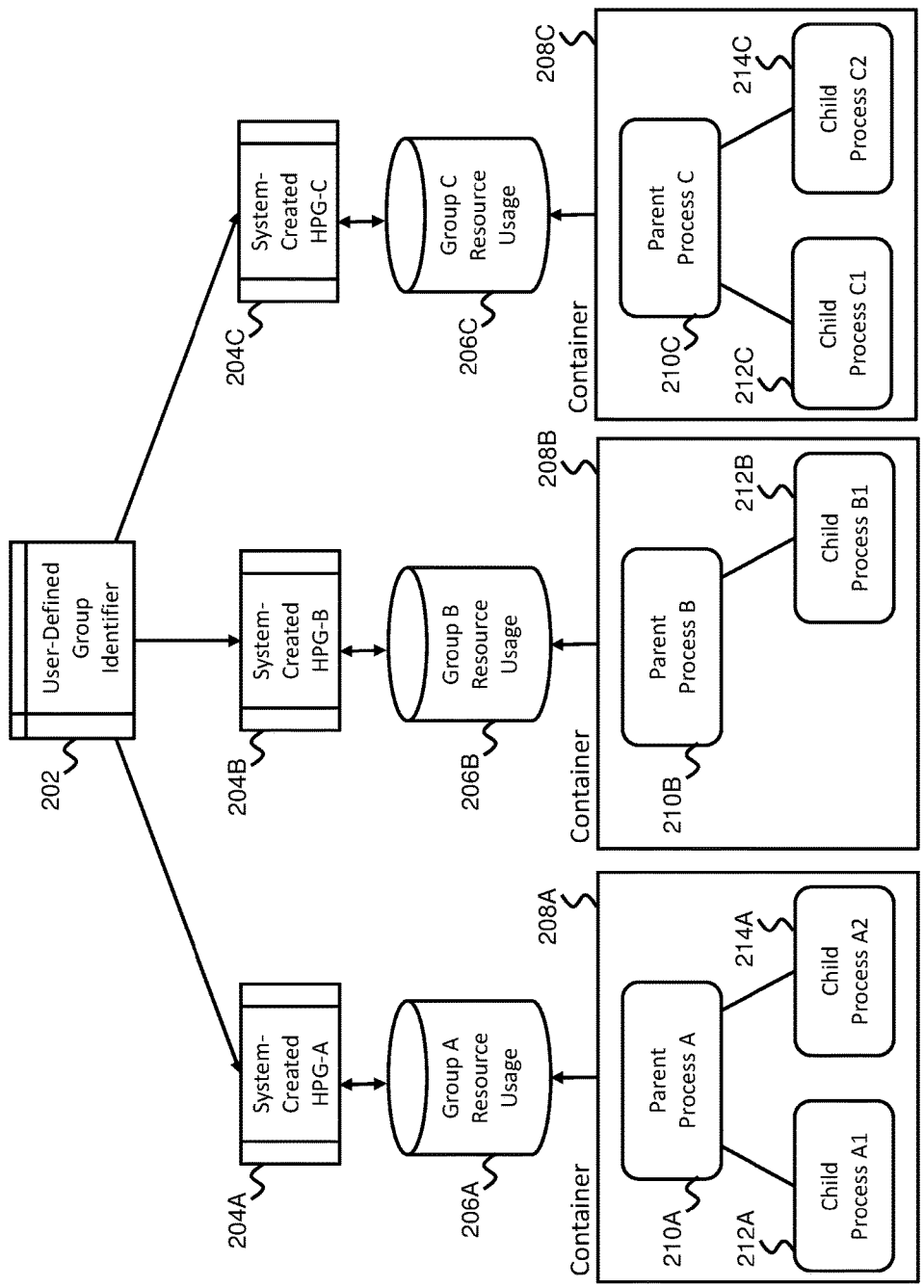
FIG. 2 is a block diagram illustrating relationships between multiple process hierarchies in separate containers managed as hierarchical process groups in accordance with exemplary embodiments.

Referring now to FIG. 2 with continued reference to FIG. 1, a block diagram illustrating relationships between multiple process hierarchies in separate containers managed as HPGs is shown in accordance with an embodiment. A group identifier 202 can be used to associate multiple HPGs, including a first HPG 204A, a second HPG 204B, and a third HPG 204C as illustrated in the example of FIG. 2. Although depicted as associating three HPGs in FIG. 2, it will be understood that the group identifier 202 can be used to associate any number of HPGs. In some embodiments, the group identifier 202 is user-defined, for instance, through a command line interface or application programming interface and created in response to a user request.

The first, second, and third HPGs 204A-204C can be system generated to associate processes in respective first, second, and third containers 208A, 208B, 208C and first, second, and third group resource usage 206A, 206B, 206C with the group identifier 202. In the example of FIG. 2, the first container 208A includes a first parent process 210A and a pair of child processes 212A, 214A. The second container 208B includes a second parent process 210B and a child process 212B. The third container 208C includes a third parent process 210C and a pair of child processes 212C, 214C.

Before any of the HPGs 204A-204C can be established, the group identifier 202 is created. The group identifier 202 is defined with a set of resource limits (e.g., a named limit set) for the HPGs 204A-204C. The resource limits can be fixed or relative to the total allocated resources of the processing system 100. A process may be associated with one and only one group identifier 202. The group identifier 202 signifies that the process is eligible to have its resources monitored in an HPG. HPG management is further described with respect to FIGS. 3-5.

Figure 3:
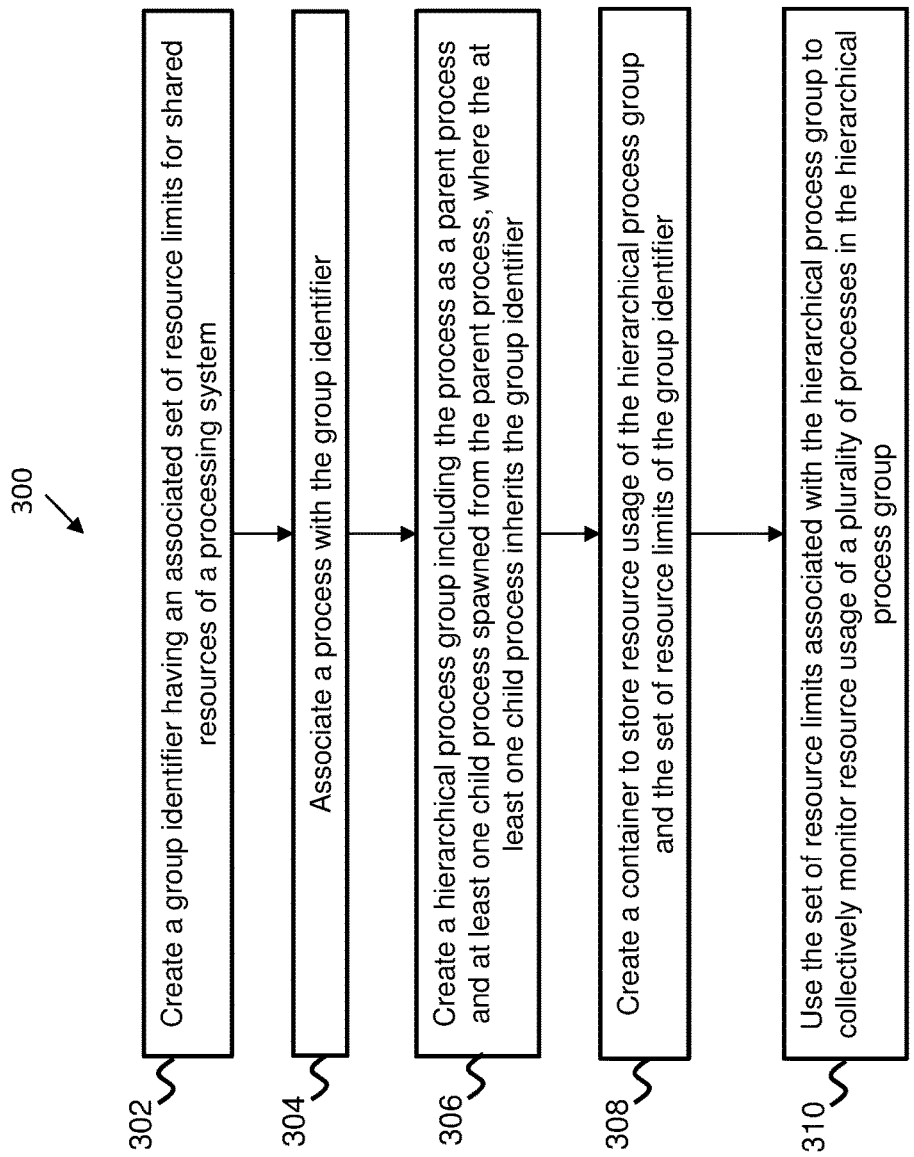
FIG. 3 shows a flow chart illustrating a method for managing hierarchical process groups in accordance with an embodiment.

Referring now to FIG. 3, a method 300 for managing HPGs is shown. The method 300 is described in further reference to FIGS. 1 and 2 and may be modified to include additional steps or an alternate order of steps. The method 300 may be performed through the HPG service 150 of FIG. 1.

At block 302, a group identifier 202 is created having an associated set of resource limits for shared resources of the processing system 100. The set of resource limits can include one or more limits with respect to memory usage, a number of reads, a number of writes, a storage block size, and a processor usage. At block 304, a process is associated with the group identifier 202. At block 306, an HPG is created, such as HPG 204A, including the process as a parent process 210A and at least one child process 212A, 214A spawned from the parent process 210A, where the at least one child process 212A, 214A inherits the group identifier 202.

At block 308, a container 208A is created to store resource usage 206A of the HPG 204A and the set of resource limits of the group identifier 202. The one or more other HPGs 204B-204C can separately store resource usage 206B-206C of each of the one or more other HPGs 204B-204C and the set of resource limits of the group identifier 202.

At block 310, the set of resource limits associated with HPG 204A is used to collectively monitor resource usage of a plurality of processes in the HPG 204A.

A process becomes associated with a group identifier either during its creation or afterward using, for instance, an application programming interface. When a process is given a group identifier using an application programming interface, it becomes possible for an HPG to be created for that process. When the process spawns a child process that inherits its group identifier, an HPG is created for both processes, such as parent process 210B and child process 212B of HPG 204B.

Figure 4:
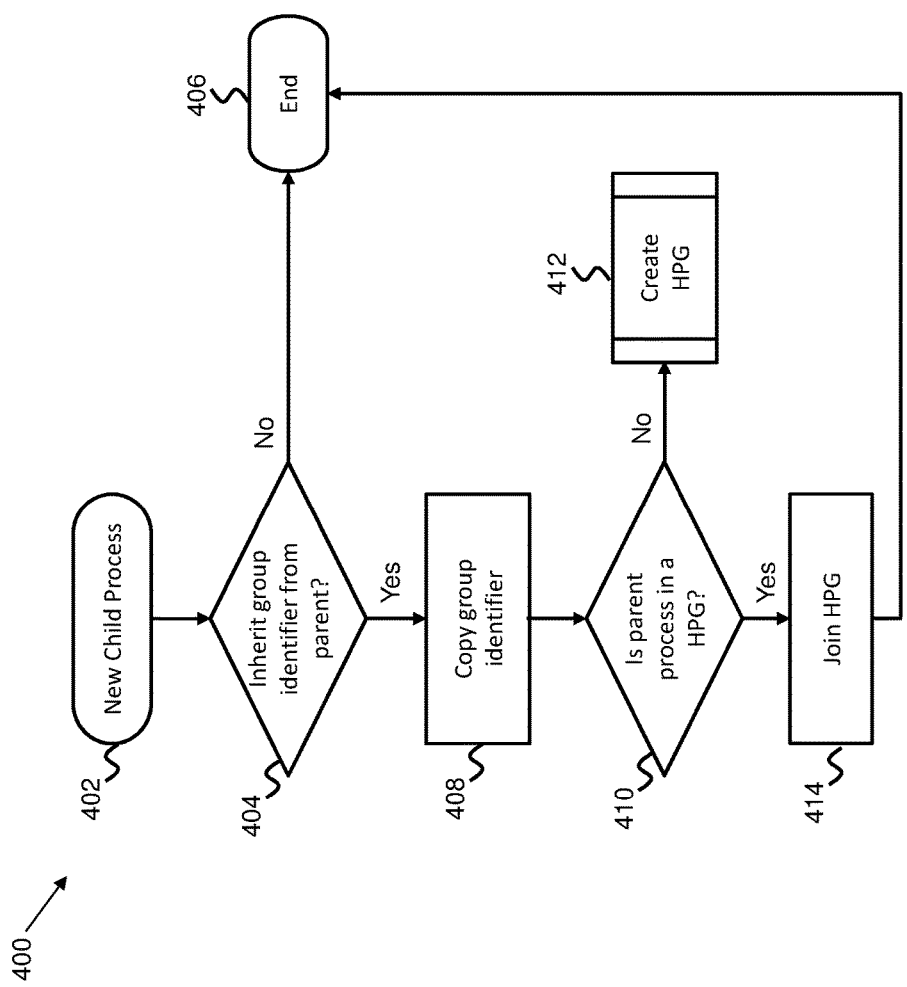
FIG. 4 shows a flow chart illustrating a method for joining a process to a hierarchical process group in accordance with an embodiment.

For instance, HPG 204B creates container 208B for storing the resource usage 206B of its members and copies the resource limits of the group identifier 202 of the parent process 210B. As depicted in the example of FIG. 4, a new child process 402 may inherit the group identifier 202 of its parent process during process creation and join the HPG of its parent process by copying the group identifier as depicted in blocks 404 and 408 of FIG. 4. If the child process 402 does not inherit its parent's group identifier, it will not be associated with the HPG of the parent process nor help in its creation as depicted in blocks 404 and 406. At block 410, if the parent process is not in an HPG, then at block 412 an HPG is created for both the parent process and the child process; otherwise, the child process joins the HPG of the parent process at block 414.

Figure 5:
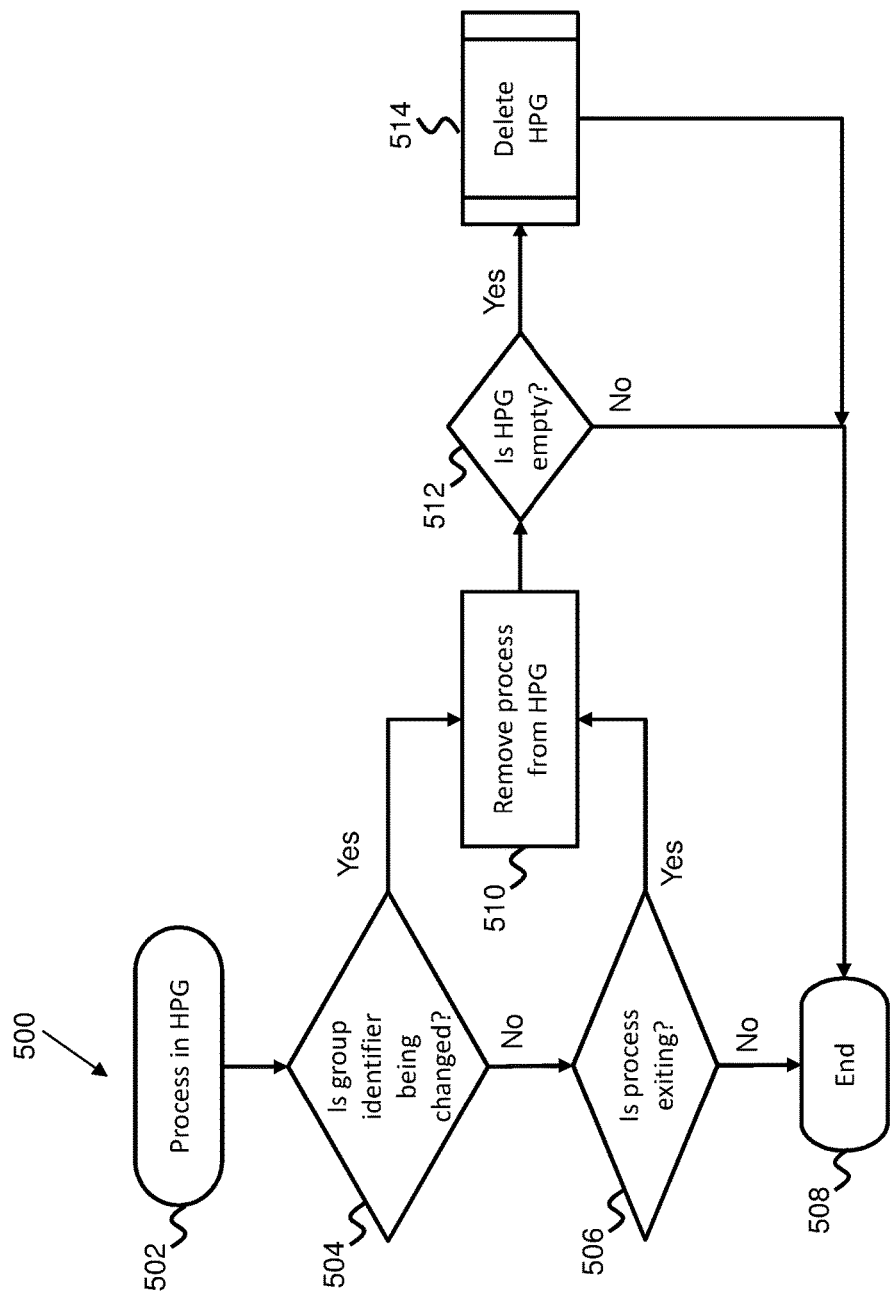
FIG. 5 shows a flow chart illustrating a method for removing a process from a hierarchical process group in accordance with an embodiment.

An HPG may continue to exist and monitor the resource usage of its members as long as at least one process is still a member. As depicted in the example of FIG. 5, a process 502 is removed from an HPG when it exits or changes/removes its group identifier, as depicted in blocks 504, 506, 508, and 510. When the last process in the HPG leaves, the HPG is deleted as depicted by blocks 512 and 514.

Any action may be taken on the single process or the whole group by a resource monitor when any usage limit is exceeded by the HPG. The resource limits and actions on the HPG may be independent from any resource monitoring of the individual processes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing hierarchical process groups, the method comprising:
    creating, by a hierarchical process group service of a processing system, a group identifier having an associated set of resource limits for shared resources of a processing system;
    associating, by the hierarchical process group service, a process with the group identifier;
    creating, by the hierarchical process group service, a hierarchical process group comprising the process as a parent process and at least one child process spawned from the parent process, wherein the at least one child process inherits the group identifier;
    creating, by the hierarchical process group service, a container to store resource usage of the hierarchical process group and the set of resource limits of the group identifier;
    using the set of resources limits associated with the hierarchical process group to collectively monitor resource usage of a plurality of processes in the hierarchical process group;
    monitoring, by the hierarchical process group service, an existing process of the hierarchical process group;
    based on determining that the group identifier of the existing process is being changed, removing the existing process from the hierarchical process group;
    based on determining that the group identifier of the existing process is not being changed, determining whether the existing process is exiting;
    based on determining that the existing process is exiting, removing the existing process from the hierarchical process group;
    based on determining that the existing process exceeds a process resource limit or the hierarchical process group exceeds at least one of the set of resources limits associated with the hierarchical process group, performing a resource allocation adjustment action in the processing system; and
    based on determining that the hierarchical process group is empty, deleting the hierarchical process group.

2. The method of claim 1, wherein the set of resource limits comprises one or more limits with respect to memory usage, a number of reads, a number of writes, a storage block size, and a processor usage.

3. The method of claim 1, further comprising:
    determining whether a new child process will inherit the group identifier from the parent process;
    based on determining that the new child process will inherit the group identifier, copying the group identifier to the new child process; and
    determining whether the parent process of the new child process is currently in the hierarchical process group.

4. The method of claim 3, further comprising:
    based on determining that the parent process is not currently in the hierarchical process group, creating a new instance of the hierarchical process group with the group identifier.

5. The method of claim 4, further comprising based on determining that the parent process is currently in the hierarchical process group, joining the new child process to the hierarchical process group.

6. A computer program product for managing hierarchical process groups, the computer program product comprising:
    a non-transitory storage medium readable by a processing circuit of a processing system and storing instructions for execution by the processing circuit for performing a method comprising:
        creating, by a hierarchical process group service of the processing system, a group identifier having an associated set of resource limits for shared resources of the processing system;
        associating, by the hierarchical process group service, a process with the group identifier;
        creating, by the hierarchical process group service, a hierarchical process group comprising the process as a parent process and at least one child process spawned from the parent process, wherein the at least one child process inherits the group identifier;
        creating, by the hierarchical process group service, a container to store resource usage of the hierarchical process group and the set of resource limits of the group identifier;
        using the set of resource limits associated with the hierarchical process group to collectively monitor resource usage of a plurality of processes in the hierarchical process group;
        monitoring, by the hierarchical process group service, an existing process of the hierarchical process group;
        based on determining that the group identifier of the existing process is being changed, removing the existing process from the hierarchical process group;
        based on determining that the group identifier of the existing process is not being changed, determining whether the existing process is exiting;
        based on determining that the existing process is exiting, removing the existing process from the hierarchical process group;
        based on determining that the existing process exceeds a process resource limit or the hierarchical process group exceeds at least one of the set of resources limits associated with the hierarchical process group, performing a resource allocation adjustment action in the processing system; and
        based on determining that the hierarchical process group is empty, deleting the hierarchical process group.

7. The computer program product of claim 6, wherein the set of resource limits comprises one or more limits with respect to memory usage, a number of reads, a number of writes, a storage block size, and a processor usage.

8. The computer program product of claim 6, wherein the method further comprises:
    determining whether a new child process will inherit the group identifier from the parent process;

based on determining that the new child process will inherit the group identifier, copying the group identifier to the new child process; and determining whether the parent process of the new child process is currently in the hierarchical process group.

9. The computer program product of claim 8, wherein the method further comprises based on determining that the parent process is not currently in the hierarchical process group, creating a new instance of the hierarchical process group with the group identifier.

10. The computer program product of claim 9, wherein the method further comprises based on determining that the parent process is currently in the hierarchical process group, joining the new child process to the hierarchical process group.

11. A processing system for managing hierarchical process groups, the processing system comprising:
a memory system; and
one or more processors operable to share access to the memory system, the one or more processors configured to:
create, by a hierarchical process group service of the processing system, a group identifier having an associated set of resource limits for shared resources of the processing system;
associate, by the hierarchical process group service, a process with the group identifier;
create, by the hierarchical process group service, a hierarchical process group comprising the process as a parent process and at least one child process spawned from the parent process, wherein the at least one child process inherits the group identifier;
create, by the hierarchical process group service, a container to store resource usage of the hierarchical process group and the set of resource limits of the group identifier;
use the set of resource limits associated with the hierarchical process group to collectively monitor resource usage of a plurality of processes in the hierarchical process group;
monitor, by the hierarchical process group service, an existing process of the hierarchical process group;
based on determining that the group identifier of the existing process is being changed, remove the existing process from the hierarchical process group;
based on determining that the group identifier of the existing process is not being changed, determine whether the existing process is exiting;
based on determining that the existing process is exiting, remove the existing process from the hierarchical process group;
based on determining that the existing process exceeds a process resource limit or the hierarchical process group exceeds at least one of the set of resources limits associated with the hierarchical process group, perform a resource allocation adjustment action in the processing system; and
based on determining that the hierarchical process group is empty, delete the hierarchical process group.

12. The processing system of claim 11, wherein the set of resource limits comprises one or more limits with respect to memory usage, a number of reads, a number of writes, a storage block size, and a processor usage.

13. The processing system of claim 11, wherein the one or more processors are configured to:
determine whether a new child process will inherit the group identifier from the parent process;
based on determining that the new child process will inherit the group identifier, copy the group identifier to the new child process; and
determine whether the parent process of the new child process is currently in the hierarchical process group.

14. The processing system of claim 13, wherein the one or more processors are configured to create a new instance of the hierarchical process group with the group identifier based on determining that the parent process is not currently in the hierarchical process group.

15. The processing system of claim 14, wherein the one or more processors are configured to join the new child process to the hierarchical process group based on determining that the parent process is currently in the hierarchical process group.

* * * * *